A. W. MALINOWSKY.
CONTENTS INDICATOR FOR CONTAINERS.
APPLICATION FILED DEC. 8, 1919.
1,379,271. Patented May 24, 1921.
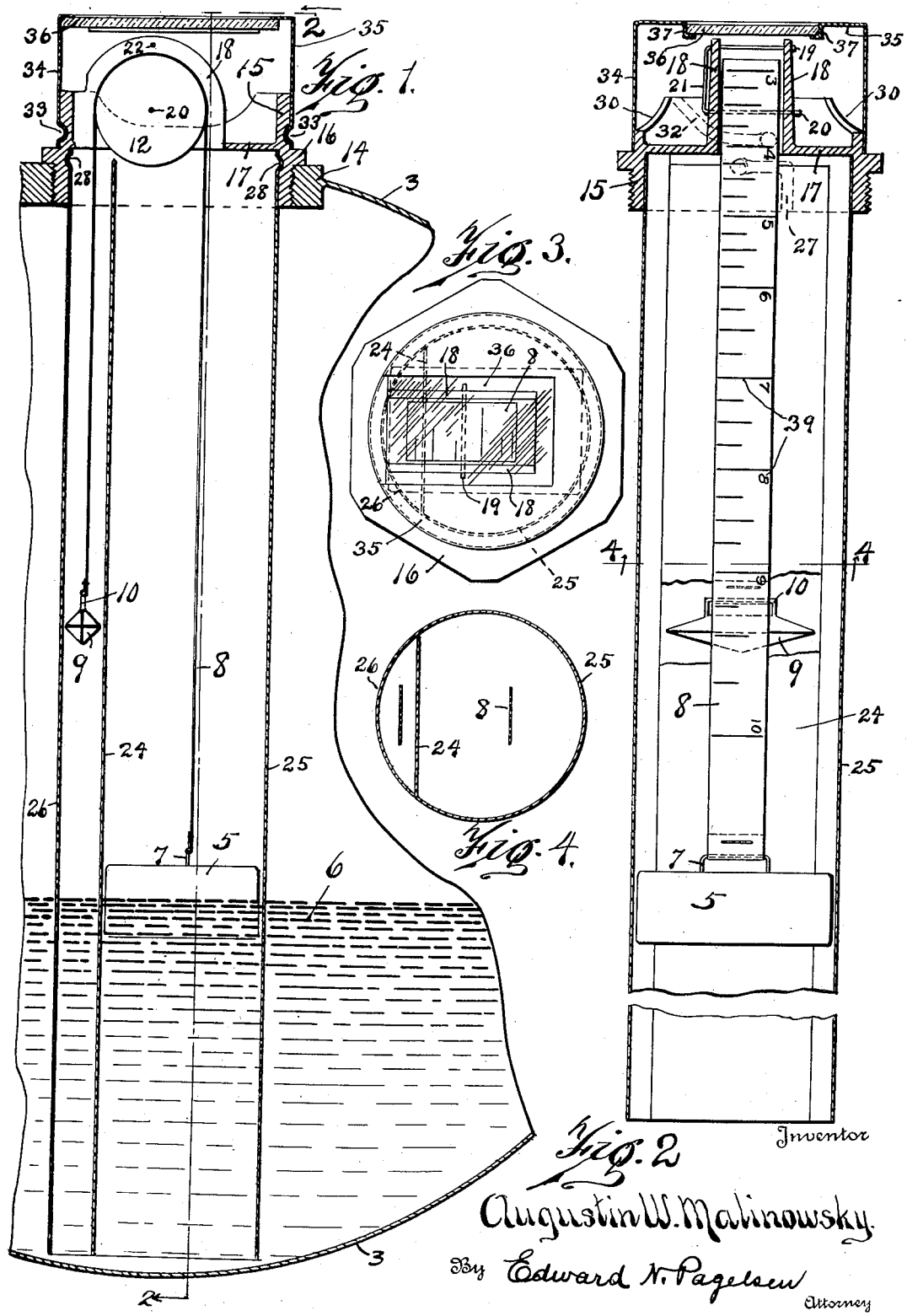

UNITED STATES PATENT OFFICE.

AUGUSTIN W. MALINOWSKY, OF DETROIT, MICHIGAN.

CONTENTS-INDICATOR FOR CONTAINERS.

1,379,271.     Specification of Letters Patent.     Patented May 24, 1921.

Application filed December 8, 1919. Serial No. 343,260.

*To all whom it may concern:*

Be it known that I, AUGUSTIN W. MALINOWSKY, a citizen of the United States, and residing at Detroit, in the county of Wayne and State of Michigan, have invented a new and Improved Contents-Indicator for Containers, of which the following is a specification.

This invention relates to means for indicating the relative amount of liquid in a container by means of graduations or characters on a movable tape attached to a float supported by the liquid in the container, and its object is to provide a device of this character which shall be simple in construction, which may be made at low cost, and which is not liable to get out of order.

In the accompanying drawing, Figure 1 is a central vertical section of this improved indicator. Fig. 2 is a section on the line 2—2 of Fig. 1, the part of the partition being broken away to show the counterweight. Fig. 3 is a plan view of this device. Fig. 4 is a section on the line 4—4 of Fig. 2. Similar reference characters refer to like parts throughout the several views.

The indicator shown in the drawing is adapted for tanks or containers of all sizes, shapes and proportions, but particularly for the fuel tanks 3 of motor vehicles wherein the contents are constantly swaying back and forth as the vehicle swings and rolls in passing over uneven roads. It embodies a float 5 adapted to be supported by the liquid 6, the float being provided with a bail 7 connected to the lower end of the tape 8, preferably made of very thin metal such as brass. A weight 9 having a bail 10 connects to the opposite end of the tape and holds it in close contact with the roller 12. The weight is of less weight than the un-supported float but of sufficient weight to sink in the liquid.

The tank is preferably provided with an internally threaded ring 14 into which screws the collar 15. This collar is preferably provided with an external hexagonal flange 16, and a transverse diaphragm 17 provided with a central opening to permit the passage of the roller 12 and tape 8. Two upright plates 18 are provided with holes to receive the pin 20 on which the roller is mounted, which pin is preferably a portion of a wire 21 which is bent as shown in Fig. 2 so that an upper portion 19 may extend through the holes 22 in both plates 18 and thereby be held in position.

A guide for the float and weight is shown in cross section in Fig. 4 and is preferably formed from sheet metal bent longitudinally to constitute a partition 24, an outer guide 25 for the float and an outer guide 26 for the weight, the parts 25 and 26 together forming a cylinder. Bayonet grooves 27 are formed on the inside of the collar 15 below the diaphragm 17, and small projections 28 are formed on the cylindrical portions 25 and 26 so that they may slide up the longitudinal legs of the bayonet grooves 27 after which the metal cylinder may be rotated to move the projections to the enlarged ends of the transverse portions of these grooves. The parts are so proportioned that these projections 28 will fit so tightly in these grooves that considerable force must be used to turn back the cylinder to release it from the collar.

The collar 15 is cut away at 30 on opposite sides of the roller 12 to permit the pin 20 to be inserted. It is also formed with external bayonet grooves 32 to receive the projections 33 on the flange 34 of the cover 35, the top of which is formed with an opening closed by the window 36 of glass. Small flanges 37 under the top of the cover hold the glass in position. The cover is attached to the collar in the same manner as is the cylindrical guide. As the float and weight are entirely within a cylindrical guide, they will not be objectionably affected by the rush of the liquid contents of the container as it flows back and forth because of the rolling and tilting of the vehicle on which the container is mounted.

The graduations 39 on the tape 8 will depend upon the size of the tank and the scale of measurement employed. The details and proportions of the various parts may all be changed to meet varying conditions by those skilled in the art without departing from the spirit of my invention as set forth in the following claims.

I claim:—

1. In combination, a collar having a transverse diaphragm and a pair of parallel plates extending upwardly from the diaphragm, a pin extending across between the plates and a roller mounted on the pin, a tape extending over the roller, a float connected to one end of the tape and a weight connected to the other end, a cylindrical guide for the weight and a guide connecting to the lower end of the collar and having a partition to separate the weight and float, and a cap over the upper end of the collar and provided with a window through which the tape may be observed.

2. In combination, a collar having a transverse diaphragm and a pair of parallel plates thereon, a roller pivotally mounted between the plates, a graduated tape extending over the roller, a float at one end of the tape and a weight at the other end, a cylindrical guide for the float and weight and a partition within the cylindrical guide to separate the float and weight, said cylindrical guide being attached to the collar by means of a bayonet joint, and a cover attached to the collar and having a glass window through which the tape may be observed.

AUGUSTIN W. MALINOWSKY.